United States Patent
Asakura et al.

(10) Patent No.: US 10,795,358 B2
(45) Date of Patent: Oct. 6, 2020

(54) AUTOMATIC DRIVING CONTROL DEVICE

(71) Applicant: HONDA MOTOR CO., LTD., Minato-ku, Tokyo (JP)

(72) Inventors: Masahiko Asakura, Wako (JP); Hitoshi Konishi, Wako (JP); Hironobu Kiryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 15/740,461

(22) PCT Filed: Jun. 1, 2016

(86) PCT No.: PCT/JP2016/066109
§ 371 (c)(1),
(2) Date: Dec. 28, 2017

(87) PCT Pub. No.: WO2017/006651
PCT Pub. Date: Jan. 12, 2017

(65) Prior Publication Data
US 2018/0314252 A1 Nov. 1, 2018

(30) Foreign Application Priority Data
Jul. 8, 2015 (JP) .................................. 2015-136969

(51) Int. Cl.
*G05D 1/00* (2006.01)
*B60W 10/04* (2006.01)
(Continued)

(52) U.S. Cl.
CPC ........... *G05D 1/0088* (2013.01); *B60W 10/04* (2013.01); *B60W 10/20* (2013.01);
(Continued)

(58) Field of Classification Search
CPC .. G05D 1/0088; G05D 1/0274; G05D 1/0212; G05D 2201/0213; G05D 1/0257;
(Continued)

(56) References Cited

U.S. PATENT DOCUMENTS

| | | | | |
|---|---|---|---|---|
| 2003/0088344 A1* | 5/2003 | Oda | ........................ | G05D 1/027 701/23 |
| 2007/0118276 A1* | 5/2007 | Suzuki | ............... | G01C 21/3415 701/414 |
| 2013/0110343 A1 | 5/2013 | Ichikawa et al. | | |

FOREIGN PATENT DOCUMENTS

| | | |
|---|---|---|
| JP | 2003-141676 | 5/2003 |
| JP | 2007-139573 | 6/2007 |
| JP | 2015-021912 | 2/2015 |

OTHER PUBLICATIONS

International Search Report and Written Opinion for International Patent Application No. PCT/JP2016/066109 dated Aug. 16, 2016, 10 pages.

* cited by examiner

*Primary Examiner* — Brian P Sweeney
(74) *Attorney, Agent, or Firm* — Amin, Turocy & Watson, LLP

(57) ABSTRACT

Provided is an automatic driving control device advantageous for a vehicle or the like in which a route can be changed during movement to a destination. An automatic driving control device, wherein a navigation device is provided with a route generation unit for generating a second route which is difference from a first route on the basis of predetermined conditions, and a determination unit for determining whether to change from the first route to the second route when an automatic driving permissible interval included in the second route is different from the automatic driving permissible interval included in the first route. When (Continued)

the route has been determined by the determination unit to be changeable from the first route to the second route, a control unit executes an automatic driving mode in the automatic driving permissible interval included in the second route.

8 Claims, 8 Drawing Sheets

(51) Int. Cl.
B60W 10/20 (2006.01)
G05D 1/02 (2020.01)
G01C 21/34 (2006.01)
G01C 21/36 (2006.01)
B60W 30/182 (2020.01)
B60W 50/00 (2006.01)

(52) U.S. Cl.
CPC .......... *B60W 30/182* (2013.01); *G01C 21/34* (2013.01); *G01C 21/3415* (2013.01); *G01C 21/3608* (2013.01); *G01C 21/3629* (2013.01); *G01C 21/3667* (2013.01); *G01C 21/3691* (2013.01); *G05D 1/0212* (2013.01); *G05D 1/0274* (2013.01); *B60W 2050/0002* (2013.01); *B60W 2050/007* (2013.01); *B60W 2510/20* (2013.01); *B60W 2520/10* (2013.01); *B60W 2540/10* (2013.01); *B60W 2540/12* (2013.01); *B60W 2554/00* (2020.02); *B60W 2710/20* (2013.01); *B60W 2720/10* (2013.01); *G05D 1/0246* (2013.01); *G05D 1/0257* (2013.01); *G05D 2201/0213* (2013.01)

(58) Field of Classification Search
CPC .. G05D 1/0246; B60W 30/182; B60W 10/20; B60W 10/04; B60W 2720/10; B60W 2710/20; B60W 2550/20; B60W 2540/12; B60W 2540/10; B60W 2520/10; B60W 2510/20; B60W 2050/007; B60W 2050/0002; B60W 2554/00; G01C 21/34; G01C 21/3691; G01C 21/3667; G01C 21/3629; G01C 21/3608; G01C 21/3415
USPC .......................................................... 701/26
See application file for complete search history.

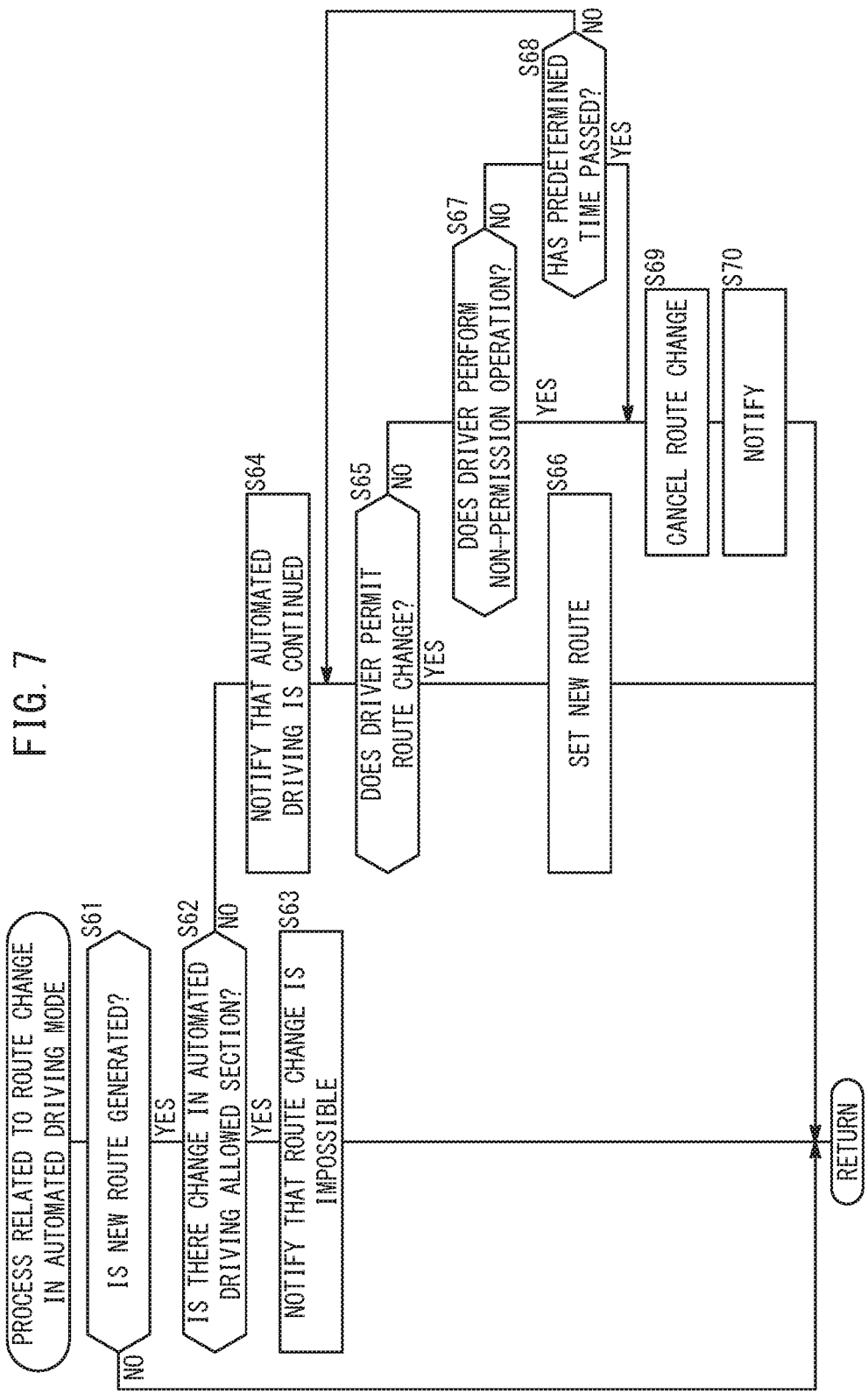

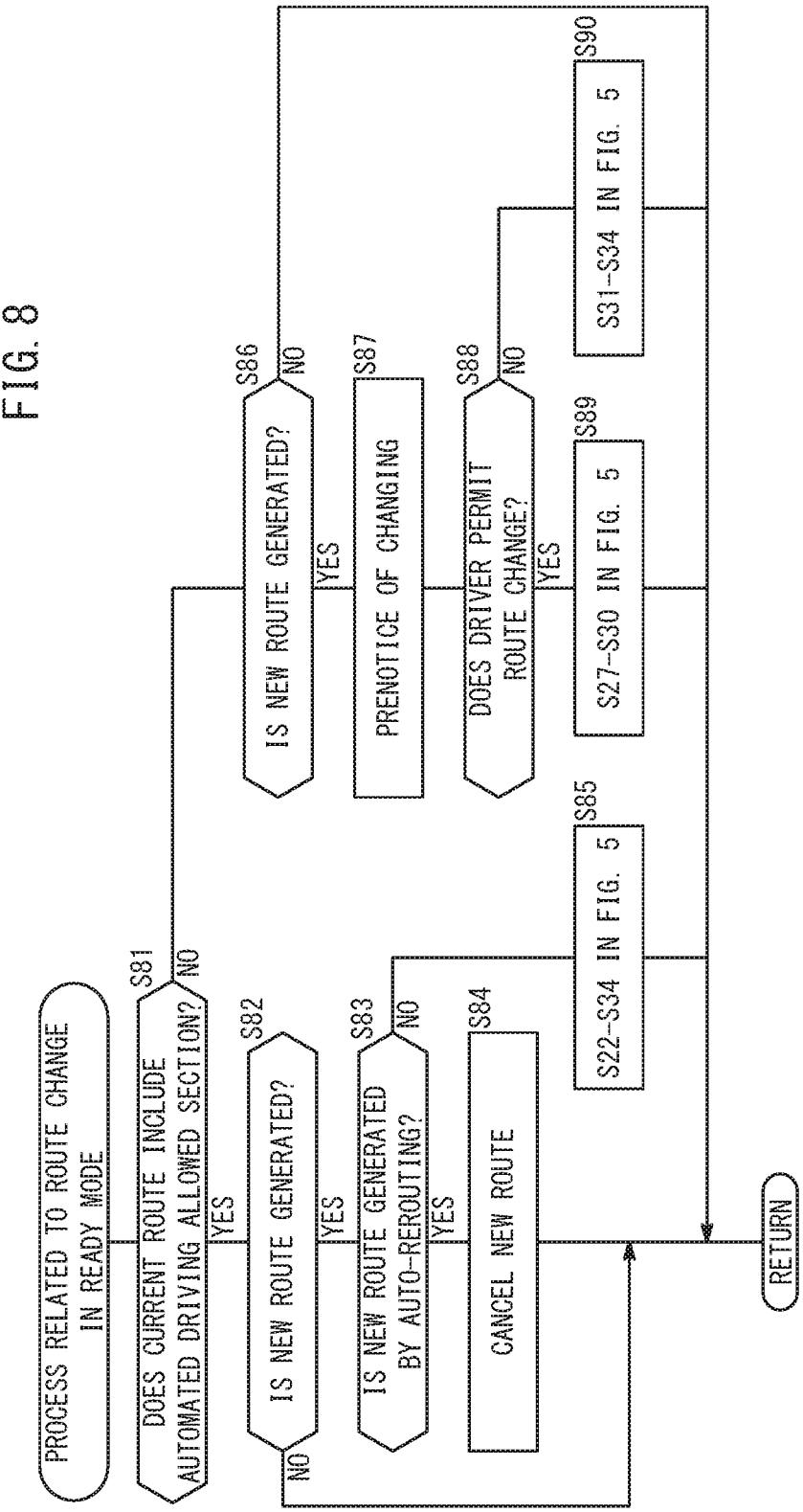

AUTOMATIC DRIVING CONTROL DEVICE

TECHNICAL FIELD

The present invention relates to an automated (automatic) driving control device that can be used in, for example, a vehicle in which a route can be guided.

BACKGROUND ART

In U.S. Patent Application Publication No. 2013/0110343 (hereinafter, referred to as "US 2013/0110343 A1"), an object is to provide the driving assistance device that the driver can easily operate intuitively without feeling a sense of discomfort ([0008] and Abstract). In order to achieve this object, in US 2013/0110343 A1, when it is instructed to perform automated driving using an automated driving switch, the automated driving mode is switched depending on whether a destination has been set and whether the driver has the intention to travel continuously.

That is to say, when a destination has been set using a destination setting unit, a route for automated driving to the destination is generated and the automated driving is started (Abstract and S12 in FIG. 2). When a destination has not been set using the destination setting unit and it is detected by a travel intention detection unit that the driver has the intention to travel continuously, a route for automated driving along the road is generated and the automated driving is started (Abstract and S16 in FIG. 2). When a destination has not been set using the destination setting unit and it is detected by the travel intention detection unit that the driver does not have the intention to travel continuously, a route for automated stopping is generated and the automated driving is started (Abstract and S18 in FIG. 2).

SUMMARY OF INVENTION

As described above, in US 2013/0110343 A1, when it is instructed to perform the automated driving using the automated driving switch, the automated driving mode is switched depending on whether a destination has been set and whether the driver has the intention to travel continuously (Abstract). However, in US 2013/0110343 A1, sufficient examinations have not been made on the case where it is instructed to perform the automated driving and in the middle of the automated driving, a new route is generated.

For example, if a destination is set using an auto-rerouting (automatic rerouting) function of a navigation device in the middle of the automated driving to the destination, changing the route automatically may cause the driver to feel a sense of discomfort.

In addition, in US 2013/0110343 A1, it is assumed that the automated driving is performed whenever it is instructed to perform the automated driving using the automated driving switch (Abstract and FIG. 2). Therefore, the technique according to US 2013/0110343 A1 is not suitable for the automated driving performed only in a particular place (for example, the place that is suitable for the automated driving on the expressway).

The present invention has been made in view of the above problem, and it is an object of the present invention to provide an automated driving control device suitably used for, for example, a vehicle in which a route can be changed in the driving to a destination.

An automated driving control device according to the present invention includes: a navigation device configured to store a road map and an automated driving allowed section on the road map, and configured to set a first route to a destination including the automated driving allowed section on a basis of a current position of a vehicle; and a control unit configured to perform an automated driving mode in which acceleration/deceleration and steering of the vehicle are automatically controlled in the automated driving allowed section included in the first route, the navigation device including: a route generation unit configured to generate a second route which is different from the first route on a basis of a predetermined condition; and a determination unit configured to determine whether it is possible to change the first route to the second route in a case that the automated driving allowed section included in the second route is different from the automated driving allowed section included in the first route, and wherein in a case that the determination unit has determined that it is possible to change the first route to the second route, the control unit is configured to perform the automated driving mode in the automated driving allowed section included in the second route.

According to the present invention, if the automated driving allowed section included in the second route is different from the automated driving allowed section included in the first route, whether it is possible to change the first route to the second route is determined. Then, if it has been determined that it is possible to change the first route to the second route, the automated driving mode is performed in the automated driving allowed section included in the second route. Therefore, even if the automatic route change (such as an auto-rerouting function of the navigation device) or the route change by the operation of the occupant has an influence on the automated driving allowed section, the route change is actually performed after determining whether it is possible to change the route. Accordingly, for example, it is possible to prevent the automated driving allowed section from being changed without the occupant's intention.

In a case of the vehicle (normal vehicle) that the driver drives, the occupant herein described may include the driver. If the vehicle is a vehicle that does not have the parts necessary for operating the vehicle, such as the steering wheel, and that the driver does not drive, the occupant does not include the driver.

The automated driving control device may include a changing unit configured to facilitate changing from the automated driving mode to a manual driving mode where an occupant of the vehicle performs a manual operation, or configured to start the manual driving mode, in a case that the second route is generated by the route generation unit in a state that the control unit is performing the automated driving mode. The determination unit may be configured to determine that it is possible to change the first route to the second route when the changing unit has completed changing the automated driving mode to the manual driving mode. Thus, even if the new route (second route) is generated in the middle of the automated driving, it is possible to prevent the automated driving from starting or ending at the timing that is not intended by the driver.

The determination unit may be configured to determine that it is not possible to change the first route to the second route when the changing unit has not completed changing the automated driving mode to the manual driving mode within a predetermined time. Thus, for example, if the occupant has the intention not to permit the change, the occupant does not need any particular operation, so that the operation can be easier. If the occupant cannot permit the change due to some troubles, the non-permission will be given without a particular operation.

In a case that the determination unit has determined that it is not possible to change the first route to the second route, the control unit may be configured to continue to perform the automated driving mode on a basis of the first route. Thus, if the route change is not performed, the vehicle continues to travel on the current route (first route). Therefore, even in the circumstances in which, for example, the route change within a predetermined time is temporarily impossible, the unnecessary stop of the vehicle can be prevented.

In a case that the route generation unit generates the second route in a state that the control unit is performing the automated driving mode, the control unit may be configured to start to decelerate the vehicle. In a case that the determination unit has determined that it is not possible to change the first route to the second route, the control unit may be configured to stop traveling of the vehicle. Thus, by starting the deceleration when the second route is generated, the vehicle can be stopped stably if the route change is not performed. This can prevent the vehicle from continuing unnecessary traveling.

The automated driving control device may include a report unit configured to report to an occupant of the vehicle that a condition to start the automated driving, which is for performing the automated driving mode in the automated driving allowed section, is satisfied; and a confirmation unit configured to confirm whether the occupant of the vehicle has an intention to start automated driving in accordance with a report from the report unit. In a case that the confirmation unit has confirmed the intention to start the automated driving, the control unit may be configured to perform the automated driving mode. Thus, since the intention of the occupant can be known at the start of the automated driving, the occupant's intention can be reflected properly.

The automated driving control device may include a notification unit configured to notify the occupant that, in a case that the automated driving allowed section included in the second route is not different from the automated driving allowed section included in the first route, a route other than the automated driving allowed section included in the second route is changed. Thus, even if there is no influence on the automated driving allowed section at the time of the route change, the route change is notified to the occupant. Therefore, it is possible to prevent the guiding of the route that is not intended by the driver in the section other than the automated driving allowed section, and the driver feels a sense of discomfort less.

An automated driving control device according to the present invention includes a navigation device configured to store a road map and an automated driving allowed section on the road map, and configured to set a first route to a destination including the automated driving allowed section on a basis of a current position of a vehicle; and a control unit configured to perform an automated driving mode in which acceleration/deceleration and steering of the vehicle are automatically controlled in the automated driving allowed section included in the first route, wherein the navigation device includes: a route generation unit configured to generate a second route which is different from the first route on a basis of a predetermined condition; and a route change prohibiting unit configured to prohibit changing of the first route to the second route, in a case that the automated driving allowed section included in the second route is different from the automated driving allowed section included in the first route.

According to the present invention, if the automated driving allowed section included in the second route is different from the automated driving allowed section included in the first route, changing from the first route to the second route is prohibited. Therefore, for example, even if the navigation device has the existing auto-rerouting function, the changing of the automated driving allowed section without the driver's intention can be prevented.

An automated driving control device according to the present invention includes a navigation device configured to store a road map and an automated driving allowed section on the road map, and configured to set a first route to a destination including the automated driving allowed section on a basis of a current position of a vehicle; and a control unit configured to perform an automated driving mode in which acceleration/deceleration and steering of the vehicle are automatically controlled in the automated driving allowed section included in the first route, wherein the navigation device includes a route generation prohibiting unit configured to prohibit generation of a second route which is different from the first route, in a case that the first route includes the automated driving allowed section.

According to the present invention, if the first route includes the automated driving allowed section, the generation of the second route which is different from the first route is prohibited. Therefore, for example, even if the navigation device has the existing auto-rerouting function, the changing of the automated driving allowed section without the driver's intention can be prevented. In addition, if the first route includes the automated driving allowed section, prohibiting the route change itself can reduce the processing burden of the navigation device.

According to the present invention, the automated driving control device suitable for the vehicle or the like in which the route can be changed in the middle of traveling to the destination can be provided. For example, the changing of the automated driving allowed section without the intention of the occupant (may include the driver) can be prevented.

BRIEF DESCRIPTION OF DRAWINGS

FIG. 7 is a flowchart of a process related to route change in the automated driving mode in a first modification; and FIG. 8 is a flowchart of a process related to route change in the ready mode in a second modification.

DESCRIPTION OF EMBODIMENT

A. Embodiment

A1. Structure

A1-1. Overall Structure

Figure 1:
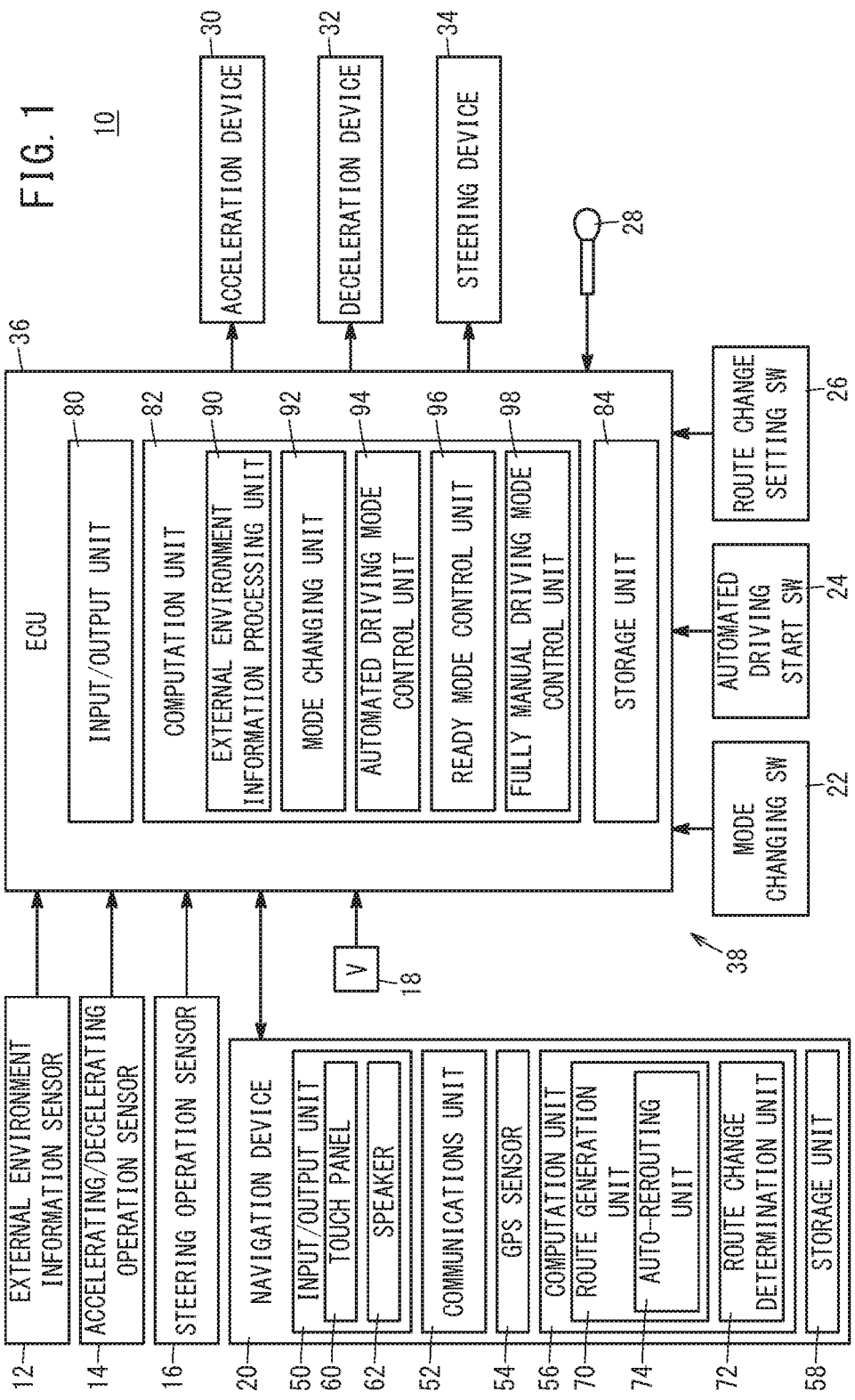
FIG. 1 is a schematic structure diagram of a vehicle including an automated driving control device according to one embodiment of the present invention.

FIG. 1 is a schematic structure diagram of a vehicle 10 including an automated driving control device 38 according to an embodiment of the present invention. As illustrated in FIG. 1, the vehicle 10 includes an external environment information sensor 12, an accelerating/decelerating operation sensor 14, a steering operation sensor 16, a vehicle speed sensor 18, a navigation device 20, a mode changing switch 22, an automated driving start switch 24, a route change setting switch 26, a microphone 28, an acceleration device 30, a deceleration device 32, a steering device 34, and an electronic control device 36 (hereinafter referred to as "ECU 36"). The automated driving control device 38 includes the navigation device 20, the mode changing switch 22, the automated driving start switch 24, the route change setting switch 26, the microphone 28, and the ECU 36.

A1-2. External Environment Information Sensor 12

The external environment information sensor 12 obtains the external environment information of the vehicle 10 (the road environment information in the periphery). The external environment information sensor 12 includes, for example, a camera that images the periphery of the vehicle 10 and a radar that irradiates the periphery of the vehicle 10 with an electromagnetic wave and detects the reflection wave. The camera may be a monocular camera or a stereo camera. The camera is installed on, for example, an upper part of the windshield inside the vehicle 10. The radar may be a millimeter-wave radar, a microwave radar, a laser radar, or the like. The radar is installed inside the front grille of the vehicle 10, for example.

A1-3. Accelerating/Decelerating Operation Sensor 14, Steering Operation Sensor 16, and Vehicle Speed Sensor 18

The accelerating/decelerating operation sensor 14 detects the accelerating operation and the decelerating operation by the driver. The accelerating/decelerating operation sensor 14 includes, for example, an accelerator pedal sensor that detects the amount of operating an accelerator pedal and a brake pedal sensor that detects the amount of operating a brake pedal. The steering operation sensor 16 detects the steering operation of the driver. The steering operation sensor 16 includes, for example, a steering angle sensor that detects the steering angle of steering wheel. The vehicle speed sensor 18 detects the vehicle speed V of the vehicle 10.

A1-4. Navigation Device 20

The navigation device 20 guides a route R to a destination Ptar of the vehicle 10. This destination Ptar may be not just the place at which the driver wants to arrive finally, but also the intermediary place. The navigation device 20 includes an input/output unit 50, a communications unit 52, a global positioning system sensor 54 (hereinafter referred to as "GPS sensor 54"), a computation unit 56, and a storage unit 58. The input/output unit 50 performs input/output of signals between the navigation device 20 and other parts, and includes an operation input/output device (HMI: Human-Machine Interface) of an occupant (including the driver). The input/output unit 50 according to the present embodiment includes a touch panel 60 and a speaker 62.

The communications unit 52 communicates wirelessly with an external device. The external device may be, for example, one of or both a traffic information server and a route guide server. The traffic information server provides the navigation device 20 of each vehicle 10 with the traffic information such as the traffic jam information, the accident information, or the construction information (which may include the information of the future construction). Based on the current position Pcur and the destination Ptar received from the navigation device 20, the route guide server generates or calculates the route R instead of the navigation device 20.

The GPS sensor 54 (current position detection unit) detects the current position Pcur of the vehicle 10.

The computation unit 56 controls the entire navigation device 20 by executing programs stored in the storage unit 58, and includes, for example, a central processing unit (CPU). The computation unit 56 includes a route generation unit 70 and a route change determination unit 72.

The route generation unit 70 generates or calculates the route R to the destination Ptar automatically or by the operation of the occupant (including the driver). That is to say, if the occupant sets a new destination Ptar through the input/output unit 50, the route generation unit 70 generates a new route Rnew to the new destination Ptar. Moreover, the route generation unit 70 includes an auto-rerouting unit 74 that automatically generates the new route Rnew on the basis of the traffic information received from the traffic information server through the communications unit 52.

The route change determination unit 72 determines whether to change the route to the new route Rnew generated by the route generation unit 70 (the details will be described with reference to FIG. 5 and FIG. 6).

Figure 2:
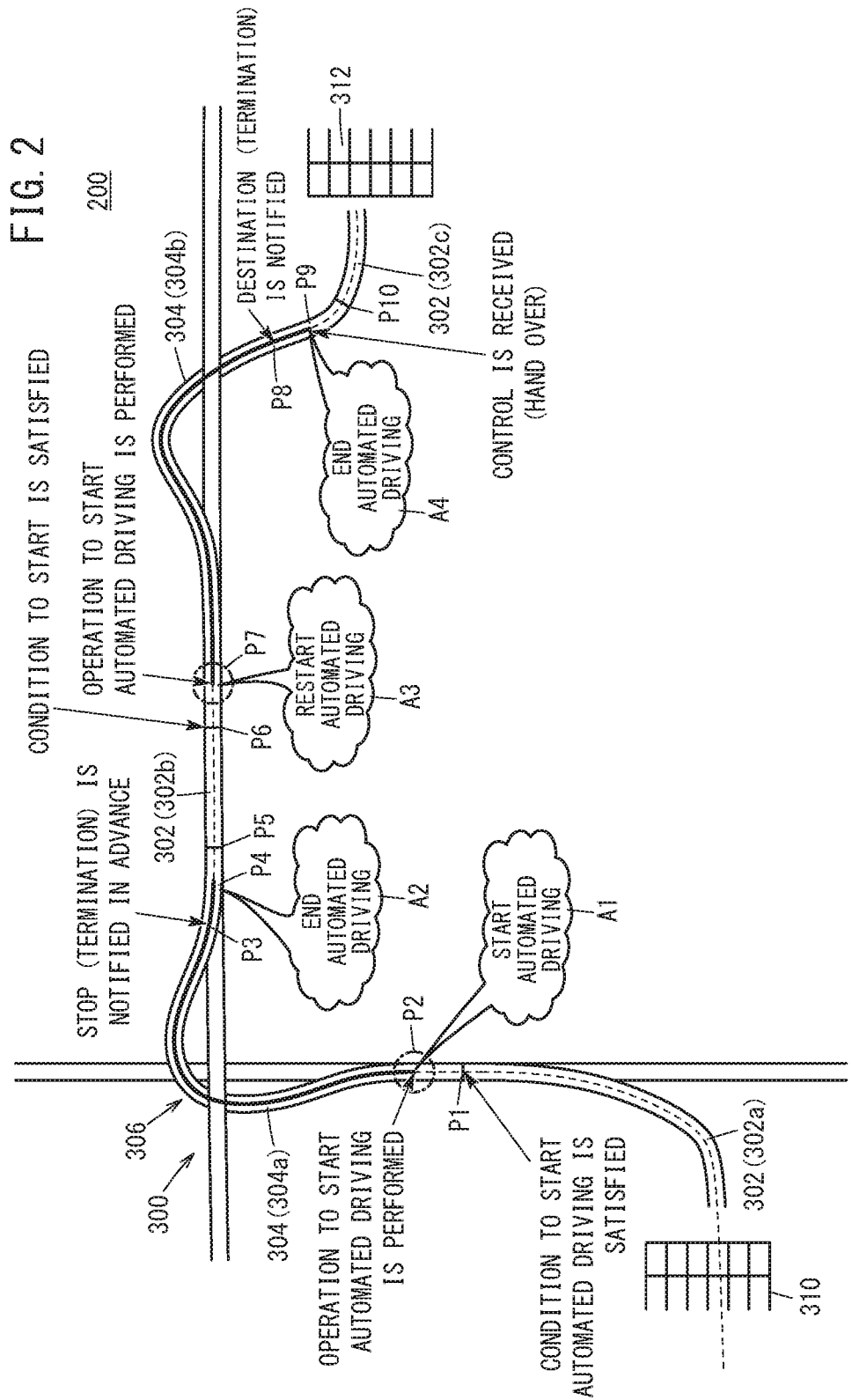
FIG. 2 is a diagram illustrating one example of changing the operation mode of the vehicle in the embodiment.

The storage unit 58 stores programs and data (including a map database) that are used by the computation unit 56. The map database stores the road map and the information of an automated driving allowed section 304 on the road map (map information Imap) (FIG. 2). The storage unit 58 includes, for example, a part (such as a random access memory (RAM)) that stores volatile data and a part (such as a read only memory (ROM)) that stores nonvolatile data.

Note that it is assumed that the navigation device 20 is placed (or fixed at all time) in the vehicle 10 in the present embodiment; however, the navigation device 20 may be carried out of the vehicle 10 like a smart phone. Alternatively, a part of the functions of the navigation device 20 may be achieved by an external device existing outside the vehicle 10. For example, instead of providing the route generation unit 70 and/or the map database in the vehicle 10, the route R and/or the map information Imap may be obtained from the route guide server.

A1-5. Mode Changing Switch 22, Automated Driving Start Switch 24, and Route Change Setting Switch 26

The mode changing switch 22 (hereinafter referred to as "changing switch 22") is a switch for the occupant (including the driver) to instruct the ECU 36 to change the driving mode. That is to say, when the changing switch 22 is on, an automated driving mode and a ready mode, which will be described below, can be selected, and when the changing switch 22 is off, a fully manual driving mode is selected.

The automated driving start switch 24 (hereinafter also referred to as "start switch 24") is a switch for the occupant (in this embodiment, the driver) to instruct the ECU 36 to start the automated driving. The route change setting switch 26 (hereinafter also referred to as "setting switch 26") is a switch for the occupant (in this embodiment, the driver) to instruct the setting of the route change.

A1-6. Microphone 28

The microphone 28 detects the voice of the occupant (including the driver) as operation input. Although the microphone 28 is illustrated as a single component in FIG. 1, the microphone 28 may be formed as a part of the navigation device 20, for example. The voice input through the microphone 28 (confirmation unit) may be used instead of one or a plurality of the changing switch 22, the start switch 24, and the setting switch 26.

A1-7. Acceleration Device 30

The acceleration device 30 operates the driving source of the vehicle 10 in accordance with the acceleration instruction from the ECU 36. When the vehicle 10 is an engine vehicle, the acceleration device 30 operates, for example, a throttle valve in accordance with the acceleration instruction, and thus operates the engine as the driving source. When the vehicle 10 is an electric vehicle, the acceleration device 30 operates the electric motor (traction motor) as the driving source in accordance with the acceleration instruction.

A1-8. Deceleration Device 32

The deceleration device 32 operates, for example, a brake actuator in accordance with the deceleration instruction from the ECU 36, and thus applies the braking force to the vehicle 10.

A1-9. Steering Device 34

The steering device 34 controls a steering angle $\theta$str of the vehicle 10, and includes a manual steering system for manual steering and an automatic steering system for automatic steering. The manual steering system includes, for example, a steering shaft, a steering gear box, a tie rod, an electric power steering device (EPS device), or the like. The EPS device in the manual steering system is used for the purpose of assisting the steering of the driver. The automatic steering system includes the EPS device or the like. The EPS device in the automatic steering system is used for the purpose of the automatic steering not requiring the steering by the driver. The EPS device includes, for example, an electric motor (EPS motor) connected to a steering shaft.

A1-10. ECU 36

The ECU 36 controls the acceleration/deceleration and the steering of the vehicle 10. The ECU 36 includes an input/output unit 80, a computation unit 82, and a storage unit 84. The input/output unit 80 performs input/output of signals between the ECU 36 and other parts.

The computation unit 82 controls the acceleration/deceleration and the steering of the vehicle 10 by executing programs stored in the storage unit 84, and includes, for example, a central processing unit (CPU). The computation unit 82 includes an external environment information processing unit 90, a mode changing unit 92, an automated driving mode control unit 94, a ready mode control unit 96, and a fully manual driving mode control unit 98.

The external environment information processing unit 90 processes external environment information Iout from the external environment information sensor 12 and obtains the information necessary for the traveling of the vehicle 10 (peripheral information Is). The peripheral information Is includes, for example, the information around the vehicle 10 (position, speed, etc.) regarding a traffic lane, traffic signals, road signs, and obstacles (for example, peripheral vehicles and pedestrians).

The mode changing unit 92 changes the driving mode of the vehicle 10. The driving mode in the present embodiment includes the automated driving mode, the ready mode (a first manual driving mode), and the fully manual driving mode (a second manual driving mode).

The automated driving mode is the mode in which the vehicle 10 is driven automatically. The ready mode (the first manual driving mode) is the manual driving mode in which the automated driving can be started but is not started yet, or in which the automated driving cannot be started. The fully manual driving mode (the second manual driving mode) is the manual driving mode in which the automated driving cannot be started.

When the changing switch 22 is on, the mode changing unit 92 selectively changes the mode between the automated driving mode and the ready mode (the default is the ready mode). When the changing switch 22 is off, the mode changing unit 92 selects the fully manual driving mode. The details of the changing of the driving mode using the mode changing unit 92 will be described below with reference to FIG. 3.

The automated driving mode control unit 94 controls the acceleration/deceleration and the steering of the vehicle 10 in the automated driving mode. Specifically, the automated driving mode control unit 94 calculates a target acceleration/deceleration $\alpha$tar and a target steering angle $\theta$strtar of the vehicle 10 on the basis of the steering angle $\theta$str from the steering operation sensor 16, the vehicle speed V from the vehicle speed sensor 18, the peripheral information Is calculated by the external environment information processing unit 90, the current position Pcur from the GPS sensor 54, and the map information Imap in the storage unit 58. Then, the automated driving mode control unit 94 controls the acceleration device 30, the deceleration device 32, and the steering device 34 so that an actual acceleration/deceleration $\alpha$and an actual steering angle $\theta$str coincide with the target acceleration/deceleration $\alpha$tar and the target steering angle $\theta$strtar.

The automated driving mode control unit 94 calculates, for example, the acceleration/deceleration $\alpha$ necessary to maintain the distance between the vehicle 10 and the preceding vehicle in accordance with a predetermined rule, or the acceleration/deceleration $\alpha$ necessary to travel on a curved road. In addition, the automated driving mode control unit 94 calculates, for example, the steering angle $\theta$str necessary for the vehicle 10 to travel along a traffic lane, or the steering angle $\theta$str necessary for steering to travel on a curved road.

The ready mode control unit 96 (the first manual driving control unit) controls the acceleration/deceleration and the steering of the vehicle 10 in the ready mode. The fully manual driving mode control unit 98 (the second manual driving control unit) controls the acceleration/deceleration and the steering of the vehicle 10 in the fully manual driving mode. As described above, the ready mode and the fully manual driving mode are the manual driving modes in which the acceleration device 30, the deceleration device 32, and the steering device 34 are mainly controlled based on the accelerating/decelerating operation and the steering operation by the driver. That is to say, the control units 96, 98 control, for example, the acceleration device 30, the deceleration device 32, and the steering device 34 on the basis of the detection values of the accelerating/decelerating operation sensor 14, the steering operation sensor 16, and the vehicle speed sensor 18.

The storage unit 84 stores programs and data that are used by the computation unit 82. The storage unit 84 includes, for example, a part (such as RAM) that stores volatile data and a part (such as ROM) that stores nonvolatile data.

The ECU 36 is not necessarily formed by a single ECU only, and may be formed by a plurality of ECUs for each of the acceleration device 30, the deceleration device 32, and the steering device 34.

A2. Various Controls

A2-1. Changing of Driving Mode

Next, the changing of the driving mode of the vehicle 10 in the present embodiment will be described. As described above, in the present embodiment, the mode changing unit 92 selectively changes the driving mode among the automated driving mode, the ready mode (the first manual driving mode), and the fully manual driving mode (the second manual driving mode).

FIG. 2 is a diagram illustrating one example of changing the driving mode of the vehicle 10 in the present embodiment. FIG. 2 illustrates one example of a confirmation screen 200 of the touch panel 60, in which new automated driving allowed sections 304 (304a, 304b) of an expressway 300 are set. In the example illustrated in FIG. 2, the changing switch 22 is on.

In FIG. 2, the road from a tollgate 310 to a point P1, the road from a point P5 to a point P6, and the road from a point P10 to a tollgate 312 correspond to automated driving not-allowed sections 302 (302a to 302c) where the automated driving cannot be performed. The road from the point P1 to the point P5 and the road from the point P6 and the point P10 correspond to the automated driving allowed sections 304 (304a, 304b) where the automated driving can be performed. Note that the automated driving allowed section 304a includes a junction 306 of the expressway 300.

In the example of FIG. 2, the section where the ready mode is selected is expressed by a dashed line. That is to say, the ready mode is selected on the road from the tollgate 310 to a point P2, the road from a point P4 to a point P7, and the road from a point P9 to the tollgate 312. In FIG. 2, the section where the automated driving mode is selected is expressed by a thick solid line. That is to say, the automated driving mode is selected on the road from the point P2 to the point P4 and the road from the point P7 to the point P9. In this embodiment, the automated driving mode is started only when the driver gives permission (S7 and S8 in FIG. 3, which will be described below). Therefore, it should be noted that the section in the ready mode and the automated driving not-allowed section 302 do not coincide perfectly and further, the section in the automated driving mode and the automated driving allowed section 304 do not coincide perfectly.

In FIG. 2, A1 to A4 schematically show the guidance voices output from the navigation device 20 at the points P2, P4, P7, and P9.

In the automated driving not-allowed section 302, only the ready mode can be selected. In the automated driving allowed section 304, the automated driving mode and the ready mode can be selected. In other words, even in the automated driving allowed section 304, the automated driving is not always performed. In order to perform the fully manual driving mode, the changing switch 22 needs to be turned off.

Figure 3:
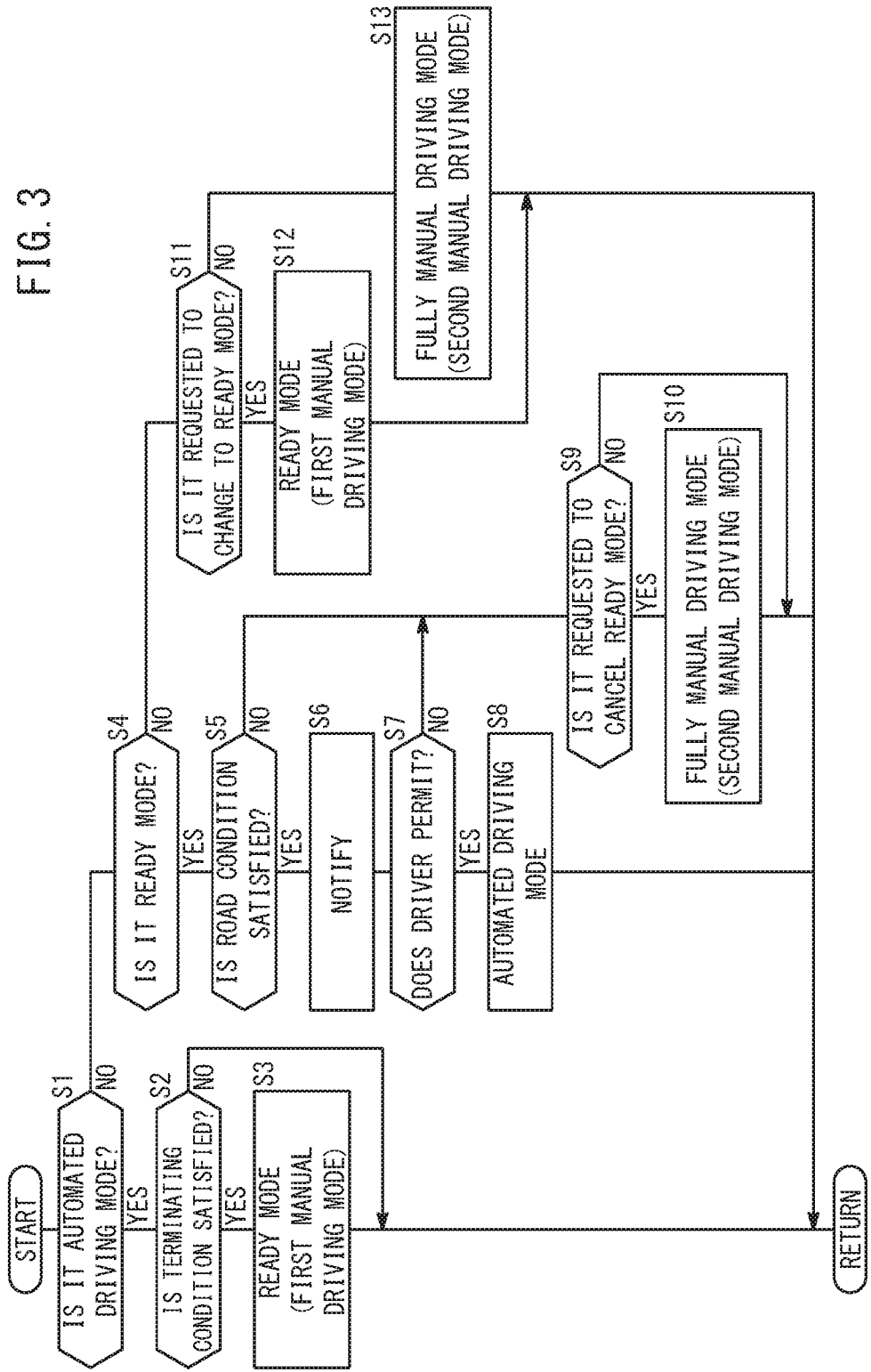
FIG. 3 is a flowchart for changing the operation mode of the vehicle in the embodiment.

FIG. 3 is a flowchart of the changing of the driving mode of the vehicle 10 in the present embodiment. Each step in FIG. 3 is performed mainly by the mode changing unit 92 of the ECU 36. Before the start of the process in FIG. 3, the navigation device 20 is turned on and the initial setting of the destination Ptar is performed. The initial setting of the destination Ptar may be a default value (for example, the home or a workplace of the occupant in the vehicle 10). Alternatively, the initial setting may be the destination Ptar newly input when the navigation device 20 is turned on. Then, the navigation device 20 selects the automated driving allowed section 304 (FIG. 2) on the basis of the initial setting of the destination Ptar.

At step S1 in FIG. 3, the mode changing unit 92 of the ECU 36 determines whether the current driving mode is the automated driving mode. If the current driving mode is the automated driving mode (S1: YES), the mode changing unit 92 of the ECU 36 determines whether the condition of terminating the automated driving is satisfied at step S2.

The terminating condition includes, for example, the fact that the automated driving allowed section 304 ends. In addition, the terminating condition may include the fact that the driver is ready to start the manual driving (i.e., the driver has the intention to start the manual driving). The intention to start the manual driving may correspond to, for example, the driver's touching on the steering wheel or stepping on the accelerator pedal or the brake pedal. Whether the driver is touching the steering wheel can be determined by, for example, the output of a contact sensor (not shown) provided to the steering wheel. Whether the driver is stepping on the accelerator pedal or the brake pedal can be determined based on the output from the operation sensors 14, 16.

In the present embodiment, when a distance Le from the vehicle 10 to the end of the automated driving allowed section 304 is less than or equal to a distance threshold THle, the driver can be notified in advance (see points P3 and P8 in FIG. 2). Whether the distance Le is less than or equal to the distance threshold THle can be determined between steps S1 and S2 in FIG. 3. This determination can be performed based on the current position Pcur of the vehicle 10 detected by the GPS sensor 54 and the map information Imap in the storage unit 58.

If the terminating condition is satisfied (S2: YES), the mode changing unit 92 of the ECU 36 changes the driving mode to the ready mode at step S3 (see the points P4 and P9 in FIG. 2). If the terminating condition is not satisfied (S2: NO), the ECU 36 terminates this computation cycle. That is to say, the ECU 36 continues to select the automated driving mode.

Back to step S1, if the current driving mode is not the automated driving mode (S1: NO), the ECU 36 determines whether the current driving mode is the ready mode at step S4. If the current driving mode is the ready mode (S4: YES), the ECU 36 determines whether the road condition for performing the automated driving (hereinafter also referred to as "automated driving road condition") is satisfied at step S5. The automated driving road condition herein described includes the fact that, for example, the vehicle 10 is in the automated driving allowed section 304. Further, road conditions in a plurality of stages may be set.

Figure 4:
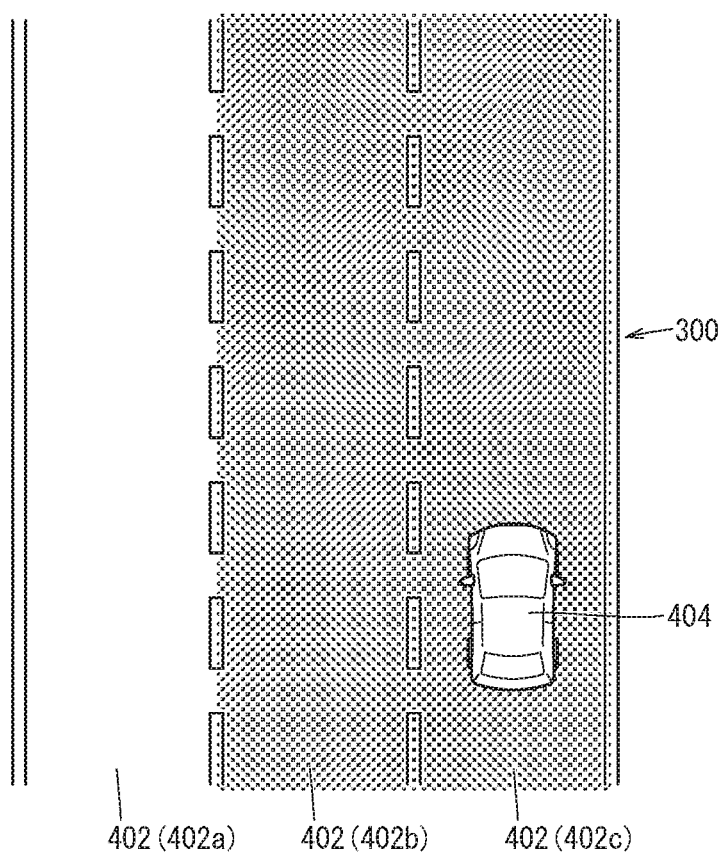
FIG. 4 is a diagram illustrating one example of a display screen of a touch panel when automated driving road conditions in a plurality of stages are used in the embodiment.

FIG. 4 is a diagram illustrating one example of a display screen 400 of the touch panel 60 when the road conditions in the plurality of stages are employed in the present embodiment. The display screen 400 is displayed on the touch panel 60 by the computation unit 56 of the navigation device 20 on the basis of the instruction from the ECU 36. In the example of FIG. 4, on the expressway 300 including a plurality of lanes 402 (402a to 402c) on one side, a vehicle icon 404 (vehicle 10) comes close to a branch point (not shown). In order to go on to the right road at the branch point, it is necessary that the vehicle 10 travel on a center lane 402b or a right lane 402c as the automated driving road condition. Therefore, on the display screen 400, the lanes 402b, 402c are displayed with emphasis and a left lane 402a is displayed without emphasis. The lanes may be emphasized by, for example, changing the luminance, the color, or the like. Alternatively, the navigation device 20 or the ECU 36 may cause the speaker 62 to output the guidance voice in accordance with the display on the screen 400.

As the road conditions in the plurality of stages, the vehicle speed V may be in a predetermined range (the speed range where the automated driving can be started). That is to say, if the vehicle speed V is too high or too low, starting the automated driving may be difficult. In view of this, the ECU 36 may set that the vehicle speed V is in the speed range where the automated driving can be started, as one of the road conditions. Alternatively, the ECU 36 may set that the vehicle speed V is lower than a vehicle speed upper-limit value or higher than a vehicle speed lower-limit value, as one of the road conditions.

If the road condition is satisfied at step S5 in FIG. 3 (S5: YES), the ECU 36 instructs the navigation device 20 to notify that the automated driving can be performed (the automated driving mode can be selected) at step S6. The navigation device 20 having received this instruction performs the notification through the speaker 62. At the following step S7, the ECU 36 determines whether the driver permits the start of the automated driving (or the changing to the automated driving mode). This determination is performed, for example, based on whether the driver turns on the start switch 24. Alternatively, the determination may be performed based on the voice input from the microphone 28.

If the driver permits the automated driving (S7: YES), the mode changing unit 92 of the ECU 36 changes the ready mode to the automated driving mode at step S8. Then, the automated driving mode control unit 94 starts the automated driving. If the automated driving road condition is not satisfied (S5: NO) or the start of the automated driving is not permitted (S7: NO), the process advances to step S9.

At step S9, the mode changing unit 92 of the ECU 36 determines whether the driver has requested to cancel the ready mode. The request for canceling the ready mode can be made by, for example, turning off the mode changing switch 22. If the driver has requested to cancel the ready mode (S9: YES), the ECU 36 changes the ready mode to the fully manual driving mode at step S10. If the driver has not requested to cancel the ready mode (S9: NO), the ECU 36 terminates the process of this computation cycle while maintaining the ready mode.

Back to step S4, if the current driving mode is not the ready mode (S4: NO), the ECU 36 determines whether the driver has requested to change the fully manual driving mode to the ready mode at step S11. The request for changing the mode to the ready mode can be made by, for example, turning on the mode changing switch 22. If the driver has requested to change the mode to the ready mode (S11: YES), the ECU 36 changes the fully manual driving mode to the ready mode at step S12. If the driver has not requested to change the mode to the ready mode (S11: NO), the ECU 36 selects or maintains the fully manual driving mode at step S13.

A2-2. Process Related to Route Change in Ready Mode

Figure 5:
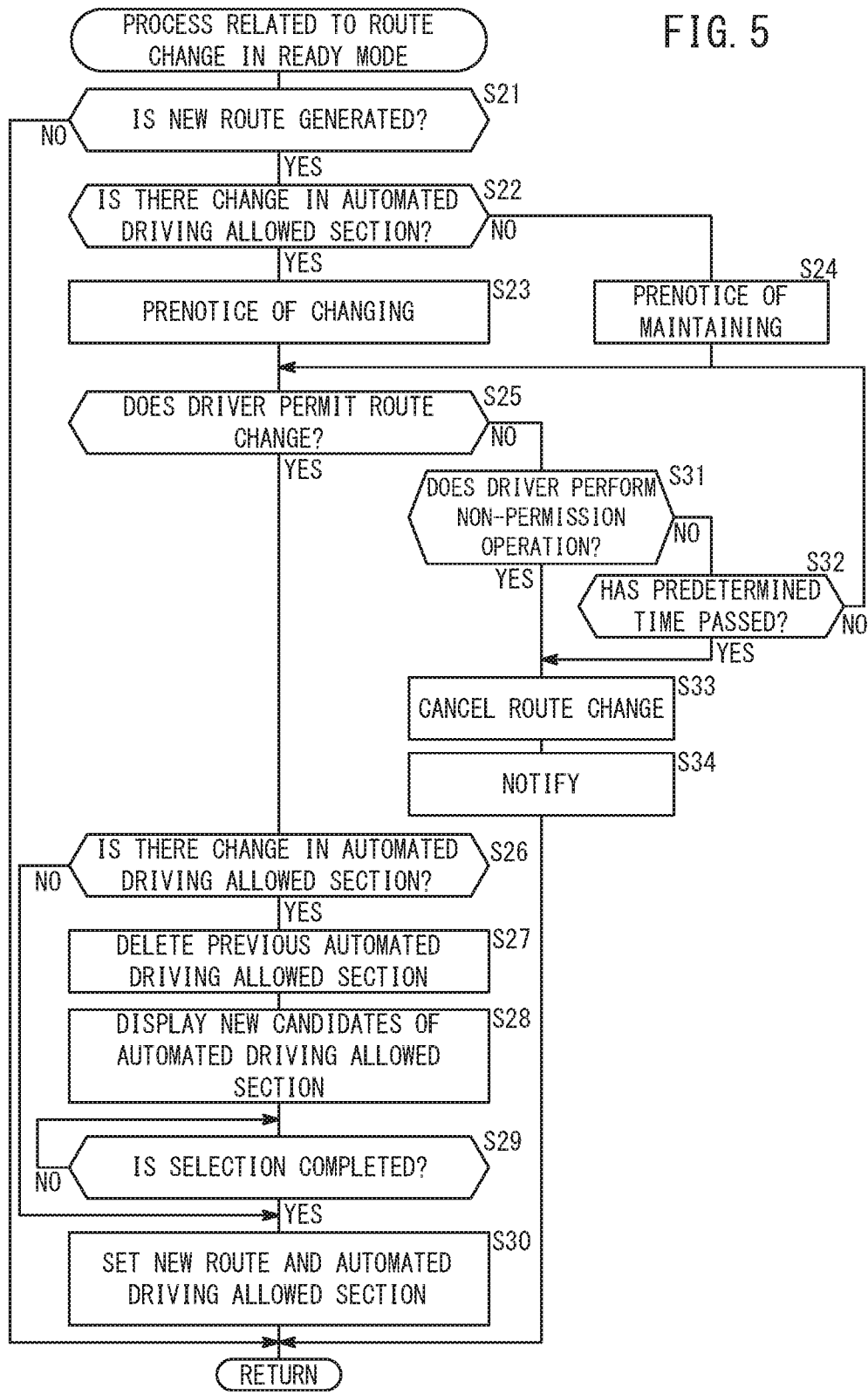
FIG. 5 is a flowchart of a process related to route change in a ready mode in the embodiment.

FIG. 5 is a flowchart of a process related to route change in the ready mode in the present embodiment. The process related to route change is a process related to generation of the new route Rnew by the route generation unit 70 of the navigation device 20. In step S21, the route change determination unit 72 of the navigation device 20 determines whether the route generation unit 70 has generated the new route Rnew. If the new route Rnew has not been generated (S21: NO), this process is terminated. After a predetermined period has passed, the process is restarted from step S21 again. If the new route Rnew has been generated (S21: YES), the process advances to step S22.

In step S22, the route change determination unit 72 determines whether there is a change in the automated driving allowed section 304 between the current route Rcur and the new route Rnew. If there is a change in the automated driving allowed section 304 (S22: YES), the route change determination unit 72 outputs through the speaker 62 and/or the touch panel 60, a prenotice of changing the automated driving allowed section 304 due to the generation of the new route Rnew (automated driving allowed section change prenotice) in step S23. If there is no change in the automated driving allowed section 304 (S22: NO), the route change determination unit 72 outputs through the speaker 62 and/or the touch panel 60, a prenotice of maintaining the automated driving allowed section 304 even after the generation of the new route Rnew (automated driving allowed section maintaining prenotice) in step S24.

In step S25, the route change determination unit 72 determines whether the driver has permitted the route change. This determination is performed, for example, based on whether the setting switch 26 is turned on, or alternatively based on the voice input to the microphone 28.

If the driver has permitted the route change (S25: YES), the route change determination unit 72 determines whether there is a change in the automated driving allowed section 304 between the current route Rcur and the new route Rnew in step S26 (similar to the process in step S22). If there is no change in the automated driving allowed section 304 (S26: NO), the process advances to step S30. If there is a change in the automated driving allowed section 304 (S26: YES), the process advances to step S27.

In step S27, the route change determination unit 72 deletes the previous automated driving allowed section 304. In step S28, the route change determination unit 72 causes the touch panel 60 to display new candidates of the automated driving allowed section 304. In step S29, when the driver has selected the automated driving allowed section 304 to perform the automated driving actually from those candidates (S29: YES), the route change determination unit 72 changes the route to the new route Rnew, sets the selected candidate of the section 304 to the new automated driving allowed section 304, and notifies the ECU 36 in step S30. The ECU 36 having received the notification performs the automated driving on the basis of the new automated driving allowed section 304.

Note that if the driver terminates the selection without selecting any automated driving allowed section 304 in step S29, the automated driving is not performed in the new route Rnew. That is to say, the route change determination unit 72 notifies the ECU 36 that the automated driving allowed section 304 does not exist. In the ECU 36 having received the notification, the mode changing unit 92 changes the driving mode to the ready mode.

The display in step S28 is the display as shown in the confirmation screen 200 in FIG. 2. In the confirmation screen 200, the candidates of the automated driving allowed section 304 are shown in a first color (for example, yellow). Then, in order to set the automated driving allowed section 304 to perform the automated driving actually, the user selects the automated driving allowed section 304 by, for example, touching the touch panel 60. The selected candidate of the automated driving allowed section 304 is shown in a second color (for example, green). Thus, among the candidates of the automated driving allowed section 304, the candidate that is selected by the user as the automated driving allowed section 304 to perform the automated driving actually can be easily recognized.

When the user selects the OK button (not shown) in a state that the candidate of the automated driving allowed section 304 to perform the automated driving actually is selected or non-selected, the route change determination unit 72 sets the automated driving allowed section 304 to perform the automated driving actually.

Back to step S25 in FIG. 5, if the route change is not permitted (S25: NO), the route change determination unit 72 determines whether the driver has performed a non-permission operation in step S31. The non-permission operation here is, for example, to press a non-permission switch that is not shown. If the non-permission operation is not performed (S31: NO), the route change determination unit 72 determines whether a predetermined time has passed in step S32. The predetermined time here is the time required to confirm the intention of the driver to change the route, and is started from, for example, step S23, step S24, or step S25 which is processed first.

If the predetermined time has not passed yet (S32: NO), the process returns to step S25. If the driver has performed the non-permission operation (S31: YES) or the predetermined time has passed (S32: YES), the process advances to step S33.

In step S33, the route change determination unit 72 cancels the route change and maintains the current route Rcur. In step S34, the route change determination unit 72 performs the notification of canceling the route change and maintaining the current route Rcur through the speaker 62 and/or the touch panel 60.

A2-3. Process Related to Route Change in Automated Driving Mode

Figure 6:
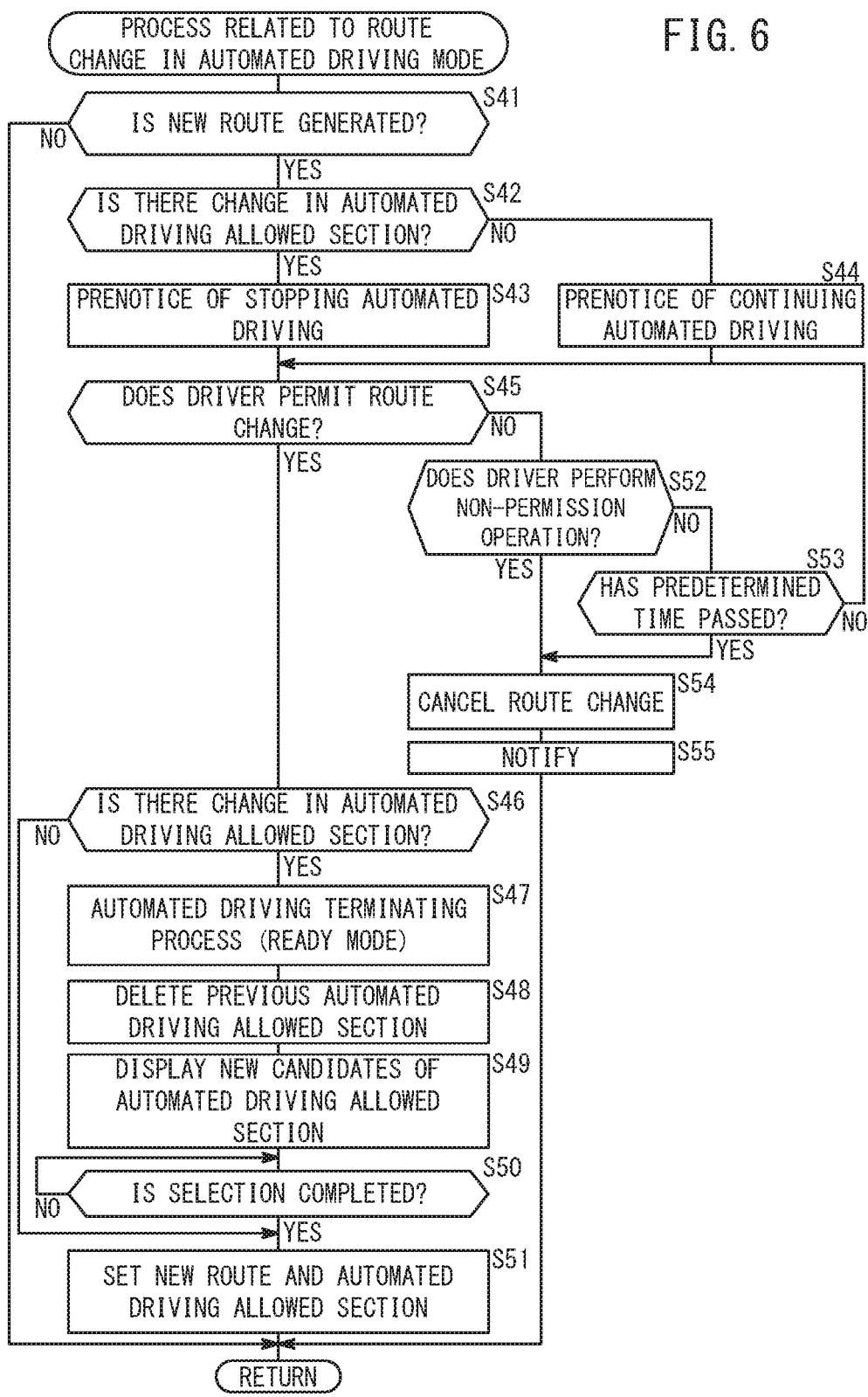
FIG. 6 is a flowchart of a process related to route change in an automated driving mode in the embodiment.

FIG. 6 is a flowchart of a process related to route change in the automated driving mode in the present embodiment. Steps S41, S42 are similar to steps S21, S22 in FIG. 5. If there is a change in the automated driving allowed section 304 in step S42 (S42: YES), the process advances to step S43. In step S43, the route change determination unit 72 outputs a prenotice of stopping the automated driving (automated driving stop prenotice) due to the generation of the new route Rnew through the speaker 62 and/or the touch panel 60. If there is no change in the automated driving allowed section 304 (S42: NO), the route change determination unit 72 outputs a prenotice of continuing the automated driving (automated driving continuing prenotice) even after the generation of the new route Rnew through the speaker 62 and/or the touch panel 60 in step S44.

In step S45, the route change determination unit 72 determines whether the driver has permitted the route change. This determination is performed in a manner similar to that in step S25. If the route change is permitted (S45: YES), the route change determination unit 72 determines whether there is a change in the automated driving allowed section 304 between the current route Rcur and the new route Rnew in step S46. If there is no change in the automated driving allowed section 304 (S46: NO), the process advances to step S51. If there is a change in the automated driving allowed section 304 (S46: YES), the process advances to step S47.

In step S47, the route change determination unit 72 notifies the ECU 36 of the permission of the route change. The ECU 36 having received the notification performs an automated driving terminating process of terminating the automated driving on the current route Rcur.

Specifically, the mode changing unit 92 of the ECU 36 confirms that the driver has the intention to start the manual driving, in a manner similar to step S2 in FIG. 3 (determining whether the terminating condition is satisfied). When the intention to start the manual driving has been confirmed, the mode changing unit 92 changes the driving mode to the ready mode and then the process advances to step S48.

Steps S48 to S51 are similar to steps S27 to S30 in FIG. 5. In step S51, the route change determination unit 72 sets the new automated driving allowed section 304. Steps S52 to S55 are similar to steps S31 to S34.

A3. Advantageous Effects of the Present Embodiment

As thus described, according to the present embodiment, if the automated driving allowed section 304 included in the new route Rnew (second route) is different from the automated driving allowed section 304 included in the current route Rcur (first route) (S22 in FIG. 5: YES, S42 in FIG. 6: YES), whether to change the current route Rcur to the new route Rnew is determined (S25 in FIG. 5, S45 in FIG. 6). If it has been determined that it is possible to change the current route Rcur to the new route Rnew (S25 in FIG. 5: YES, S45 in FIG. 6: YES), the automated driving mode is performed in the automated driving allowed section 304 included in the new route Rnew (S8 in FIG. 3). Thus, if the automatic route change (for example, the auto-rerouting function of the navigation device 20) or the route change by the occupant's operation has an influence on the automated driving allowed section 304, the route change is performed actually after determining whether the route change is possible (S30 in FIG. 5, S51 in FIG. 6). Therefore, for example, it is possible to prevent the automated driving allowed section 304 from being changed without the occupant's intention.

In the present embodiment, if the route generation unit 70 generates the new route Rnew (second route) in a state that the automated driving mode control unit 94 (control unit) is performing the automated driving mode (S41 in FIG. 6: YES), the mode changing unit 92 (changing unit) changes the mode to the ready mode (first manual driving mode) (S47) through, for example, the driver's permission to change the route (S45: YES). In other words, if the route generation unit 70 has generated the new route Rnew in a state that the automated driving mode control unit 94 is performing the automated driving mode, the mode changing unit 92 facilitates or starts the change from the automated driving mode to the ready mode (first manual driving mode).

The route change determination unit 72 (determination unit) determines that it is possible to change the current route Rcur (first route) to the new route Rnew (second route) (S48 to S51) when the mode changing unit 92 has completed changing the automated driving mode to the ready mode (automated driving terminating process (S47 in FIG. 6)). Thus, even if the new route Rnew is generated in the automated driving, it is possible to prevent the automated driving from starting or ending at the timing that is not intended by the driver.

In the present embodiment, the route change determination unit 72 (determination unit) determines that the change from the current route Rcur (first route) to the new route Rnew (second route) is impossible (S54) when the mode changing unit 92 (changing unit) has not completed changing the automated driving mode to the ready mode (first manual driving mode) within a predetermined time (S53 in FIG. 6: YES). Thus, for example, if the occupant has the intention not to permit the change, the occupant does not need any particular operation, so that the operation can be easier. If the occupant cannot permit the change due to some troubles, the permission will not be given without a particular operation.

In the present embodiment, if the route change determination unit 72 (determination unit) has determined that the change from the current route Rcur (first route) to the new route Rnew (second route) is impossible (S45: NO and S52: YES, or S53: YES in FIG. 6), the automated driving mode control unit 94 (control unit) continues to perform the automated driving mode on the basis of the current route Rcur (S54 in FIG. 6). Thus, if the route change is not performed, the vehicle continues to travel on the current route Rcur (first route). Therefore, even in the circumstances in which, for example, the route change within a predetermined time is temporarily impossible, the unnecessary stop of the vehicle 10 can be prevented.

In the present embodiment, the speaker 62 and the touch panel 60 (report unit) are provided (FIG. 1) to report (S6) to an occupant of the vehicle 10 that a condition to start the automated driving for performing the automated driving mode in the automated driving allowed section 304 is satisfied (S5 in FIG. 3: YES). In addition, the automated driving start switch 24 (confirmation unit) is provided (FIG. 1) to confirm (S7 in FIG. 3) the intention of the occupant of the vehicle 10 to start the automated driving in accordance with the report from the speaker 62 and the touch panel 60. If the intention to start the automated driving is confirmed by the start switch 24 (S7 in FIG. 3: YES), the automated driving mode control unit 94 performs the automated driving mode (S8). Since the intention of the occupant is confirmed at the start of the automated driving in this manner, the occupant's intention can be reflected as appropriate.

In this embodiment, the speaker 62 and the touch panel 60 (notification unit) are provided (FIG. 1) to notify (S24, S44) the occupant that, if the automated driving allowed section 304 included in the new route Rnew (second route) is not different from the automated driving allowed section 304 included in the current route Rcur (first route) (S22 in FIG. 5: NO, S42 in FIG. 6: NO), the route R other than the automated driving allowed section 304 included in the new route Rnew is changed.

Even if there is not any influence on the automated driving allowed section 304 at the time of the route change, the route change is notified to the occupant. Therefore, it is possible to prevent the guiding of the route R that is not intended by the occupant in the section other than the automated driving allowed section 304, and the occupant feels a sense of discomfort less.

B. Modifications

Note that the present invention is not limited to the above-described embodiment, and various structures can be employed based on the content described in the present specification. For example, the following structures can be employed.

B1. Application Object

In the above embodiment, the present invention is applied to the vehicle 10 (FIG. 1). However, for example, the present invention is not limited to this from the viewpoint of preventing the route change that is not intended by the occupant (that may include the driver or the operator). For example, the present invention is also applicable to other moving object performing the automated driving along the route R (such as ship or aircraft). In the present embodiment, the vehicle 10 is a manned vehicle; however, the present invention is also applicable to the vehicle 10 carrying no one, which is controlled remotely.

B2. Touch Panel 60 and Speaker 62 (Report Unit)

In the above embodiment, the touch panel 60 and the speaker 62 that give notifications and prenotices are included in the navigation device 20 (FIG. 1). However, from the viewpoint of the report unit that gives various notifications and/or prenotices, the present invention is not limited thereto. For example, a display or a speaker may be provided separately from the navigation device 20.

In the above embodiment, the notifications and the prenotices are given by the touch panel 60 (display device) and/or the speaker 62 (sound output device) (S6 in FIG. 3, S23, S24, S34 in FIG. 5, and S43, S44, S55 in FIG. 6). However, for example, from the viewpoint of giving the notifications and the prenotices, the present invention is not limited thereto. In another example, the notifications and the prenotices can be given by a vibration applying device that applies vibration to the driver. One example of such a vibration applying device is a device that automatically controls the tension of a seat belt.

B3. Driving Mode

In the above embodiment, the driver's permission is included in the condition to start the automated driving mode (S7 in FIG. 3: YES). However, for example, from the viewpoint of obtaining the driver's permission in generating the new route Rnew (S25 in FIG. 5, S45 in FIG. 6), the present invention is not limited thereto and the automated driving mode may be started without the driver's permission. In other words, the invention according to the present application is applicable to the structure as disclosed in US 2013/0110343 A1. In this case, the automated driving allowed section 304 in the above embodiment corresponds to the section in which the automated driving mode is performed.

B4. Process Related to Route Change (FIG. 5 and FIG. 6)

In the above embodiment, the permission of the occupant (driver) for the route change is necessary (S25 in FIG. 5, S45 in FIG. 6) not only in the case where the automated driving allowed section 304 included in the new route Rnew is different from the automated driving allowed section 304 included in the current route Rcur (S22 in FIG. 5: YES, S42 in FIG. 6: YES) but also in the case where those automated driving allowed sections 304 are not different (S22 in FIG. 5: NO, S42 in FIG. 6: NO). However, for example, when the focus is on the case where the automated driving allowed section 304 included in the new route Rnew is different from the automated driving allowed section 304 included in the current route Rcur, it is also possible not to confirm the permission of the occupant (driver) for the route change when those automated driving allowed sections 304 are not different.

In the above embodiment, also in the case where there is a change in the automated driving allowed section 304 in the new route Rnew (S22 in FIG. 5: YES, S42 in FIG. 6: YES), the new automated driving allowed section 304 is set (S30, S51) as long as there is the driver's permission (S25: YES, S45: YES). However, from the viewpoint of preventing the automated driving allowed section 304 from being changed without the intention of the occupant (which may include the driver), the present invention is not limited thereto.

FIG. 7 is a flowchart of a process related to route change in the automated driving mode in a first modification. In the first modification, if there is a change in the automated driving allowed section 304 in the new route Rnew, the route change determination unit 72 has a unit (route change prohibiting unit) that prohibits the change from the current route Rcur to the new route Rnew. Although FIG. 7 shows the process related to route change in the automated driving mode (corresponding to FIG. 6 in the above embodiment), the process related to route change in the ready mode (corresponding to FIG. 5 in the above embodiment) may be similar to the process in FIG. 7.

Steps S61, S62 in FIG. 7 are similar to steps S21, S22 in FIG. 5 and steps S41, S42 in FIG. 6. If there is a change in the automated driving allowed section 304 in step S62 (S62: YES), the route change determination unit 72 outputs through the speaker 62 and/or the touch panel 60, the notification that the route change is impossible (route change impossible notification) in step S63. Alternatively, in the case of generating the new route Rnew by auto-rerouting, the new route Rnew may be canceled without notifying that the route change is impossible.

If there is no change in the automated driving allowed section 304 (S62: NO), the route change determination unit 72 outputs through the speaker 62 and/or the touch panel 60, the notification that the automated driving is continued even after the generation of the new route Rnew (automated driving continuation notification) in step S64.

In step S65, the route change determination unit 72 determines whether the driver has permitted the route change. This determination is performed in a manner similar to that of steps S25 in FIG. 5 and S45 in FIG. 6. If the route change is permitted (S65: YES), the route change determination unit 72 performs the route change and sets the new route Rnew in step S66. If the driver does not permit the route change (S65: NO), the process advances to step S67. Steps S67 to S70 are similar to steps S31 to S34 in FIG. 5 and steps S52 to S55 in FIG. 6.

According to the first modification, if the automated driving allowed section 304 included in the new route Rnew (second route) is different from the automated driving allowed section 304 included in the current route Rcur (first route) (S62 in FIG. 7: YES), the change from the current route Rcur to the new route Rnew is prohibited (see S63 in FIG. 7). Therefore, even when the navigation device 20 has the existing auto-rerouting function, for example, the changing of the automated driving allowed section 304 without the intention of the occupant (which may include the driver) can be prevented.

FIG. 8 is a flowchart of a process related to route change in the ready mode in a second modification. In the second modification, if the current route Rcur includes the automated driving allowed section 304, the route change determination unit 72 includes a unit that prohibits the auto-rerouting in the navigation device 20 (auto-rerouting prohibiting unit or route generation prohibiting unit). Although FIG. 8 shows the process related to route change in the ready mode (corresponding to FIG. 5 in the above embodiment), the determination as to the route change itself can be omitted in the process related to route change in the automated driving mode (corresponding to FIG. 6 in the above embodiment).

In step S81 in FIG. 8, the route change determination unit 72 determines whether there is the automated driving allowed section 304 in the current route Rcur. If there is the automated driving allowed section 304 in the current route Rcur (S81: YES), the route change determination unit 72 determines whether the route generation unit 70 has generated the new route Rnew in step S82. If the route generation unit 70 has not generated the new route Rnew (S82: NO), this process ends.

If the route generation unit 70 has generated the new route Rnew (S82: YES), the route change determination unit 72 determines whether the new route Rnew is generated by the auto-rerouting in step S83. If the new route Rnew is generated by the auto-rerouting (S83: YES), the route change determination unit 72 cancels the new route Rnew in step S84. If the new route Rnew is not generated by the auto-rerouting (S83: NO), for example, the new destination Ptar is set by the operation of the occupant (which may include the driver). In this case, in step S85, the route change determination unit 72 selectively performs steps S22 to S34 in FIG. 5.

Note that in the case where the mode changing switch 22 is on or the automated driving mode is selected, the navigation device 20 can stop the operation of the auto-rerouting unit 74 instead of providing step S83.

Back to step S81, if there is not the automated driving allowed section 304 in the current route Rcur (S81: NO), the route change determination unit 72 determines whether the route generation unit 70 has generated the new route Rnew in step S86. If the route generation unit 70 has not generated the new route Rnew (S86: NO), this process ends.

If the route generation unit 70 has generated the new route Rnew (S86: YES), the route change determination unit 72 outputs a prenotice of changing the automated driving allowed section 304 (automated driving allowed section change prenotice) due to the generation of the new route Rnew through the speaker 62 and/or the touch panel 60 in step S87.

In step S88, the route change determination unit 72 determines whether the driver has permitted the route change. If the driver has permitted the route change (S88: YES), the route change determination unit 72 in step S89 selectively performs steps S27 to S30 in FIG. 5. If the driver has not permitted the route change (S88: NO), the route change determination unit 72 in step S90 selectively performs steps S31 to S34 in FIG. 5.

According to the second modification, if the current route Rcur (first route) includes the automated driving allowed section 304 (S81 in FIG. 8: YES), the generation of the new route Rnew (second route) different from the current route Rcur is prohibited (S84). Therefore, even when the navigation device 20 has the existing auto-rerouting function, for example, the changing of the automated driving allowed section 304 without the intention of the occupant can be prevented. In addition, if the current route Rcur includes the automated driving allowed section 304, prohibiting the route change itself can reduce the processing burden of the navigation device 20.

In the above embodiment, if the driver's operation of permitting or not permitting the route change is not performed for a predetermined time (S32 in FIG. 5: YES, S53 in FIG. 6: YES), the route change determination unit 72 determines that the route change is not permitted and cancels the route change (S33 in FIG. 5, S54 in FIG. 6); however, other process may be performed. For example, if the driver's operation of permitting or not permitting the route change is not performed (S25: NO→S31: NO in FIG. 5, S45: NO→S52: NO in FIG. 6), the route change determination unit 72 starts to decelerate the vehicle 10 through the automated driving mode control unit 94. Then, if the operation is not performed for a predetermined time after that and the route change determination unit 72 has determined that the change from the current route Rcur to the new route Rnew is impossible, the automated driving mode control unit 94 can stop the travel of the vehicle 10. Thus, by starting the deceleration when the new route Rnew is generated, the vehicle can be stopped stably if the route change is not performed. This can prevent the vehicle from continuing unnecessary traveling.

In the above embodiment, if the driver has permitted the route change in the process related to route change in the automated driving mode (FIG. 6) (S45: YES) and there is a change in the automated driving allowed section 304 (S46: YES), the mode is returned to the ready mode (S47). If there is no change in the automated driving allowed section 304 (S46: NO), the automated driving mode is continued. However, regardless of whether there is a change in the automated driving allowed section 304, the mode may be returned to the ready mode. In other words, step S46 in FIG. 6 may be omitted. Similarly, step S26 may be omitted in the process related to route change in the ready mode (FIG. 5).

C. EXPLANATION OF REFERENCE CHARACTERS

10: vehicle
20: navigation device
24: automated driving start switch (confirmation unit)
28: microphone (confirmation unit)
36: ecu
38: automated driving control device
60: touch panel (report unit, notification unit)
62: speaker (report unit, notification unit)
70: route generation unit
72: route change determination unit (determination unit)
92: mode changing unit (changing unit)
94: automated driving mode control unit (control unit)
304, 304a, 304b: automated driving allowed section
Pcur: current position
Ptar: destination
Rcur: current route (first route)
Rnew: new route (second route)

What is claimed is:

1. An automated driving control device comprising:
a navigation device configured to store a road map and an automated driving allowed section on the road map, and configured to set a first route to a destination including the automated driving allowed section on a basis of a current position of a vehicle; and
one or more first processors functioning as an automated driving mode control unit configured to perform an automated driving mode in which acceleration/deceleration and steering of the vehicle are automatically controlled in the automated driving allowed section included in the first route,
wherein the navigation device comprises one or more second processors functioning as:
a route generation unit configured to generate a second route which is different from the first route on a basis of a predetermined condition; and
a route change determination unit configured to determine whether it is possible to change the first route to the second route in a case that the automated driving allowed section included in the second route is different from the automated driving allowed section included in the first route,
wherein in a case that route change determination unit has determined that it is possible to change the first route to the second route, the automated driving mode control unit is configured to perform the automated driving mode in the automated driving allowed section included in the second route,
wherein the one or more first processors function as a mode changing unit configured to facilitate changing from the automated driving mode to a manual driving mode where an occupant of the vehicle performs a manual operation or configured to start the manual driving mode, in a case that the second route is generated by the route generation unit in a state that the automated driving mode control unit is performing the automated driving mode, and
wherein the route change determination unit is configured to determine that it is possible to change the first route to the second route when the mode changing unit has completed changing the automated driving mode to the manual driving mode.

2. The automated driving control device according to claim 1, wherein the route change determination unit is configured to determine that it is not possible to change the first route to the second route when the mode changing unit has not completed changing the automated driving mode to the manual driving mode within a predetermined time.

3. The automated driving control device according to claim 2, wherein in a case that the route change determination unit has determined that it is not possible to change the first route to the second route, the automated driving mode control unit is configured to continue to perform the automated driving mode on a basis of the first route.

4. The automated driving control device according to claim 2, wherein in a case that the route generation unit generates the second route in a state that the automated driving mode control unit is performing the automated driving mode, the automated driving mode control unit is configured to start to decelerate the vehicle,
in a case that the route change determination unit has determined that it is not possible to change the first route to the second route, the automated driving mode control unit is configured to stop traveling of the vehicle.

5. The automated driving control device according to claim 1, comprising:
a display device or a sound output device configured to report to an occupant of the vehicle that a condition to start the automated driving, which is for performing the automated driving mode in the automated driving allowed section, is satisfied; and
a switch configured to confirm whether the occupant of the vehicle has an intention to start automated driving in accordance with a report from the display device or the sound output device,
wherein in a case that the switch has confirmed the intention to start the automated driving, the automated driving mode control unit is configured to perform the automated driving mode.

6. The automated driving control device according to claim 1, comprising a display device or a sound output device configured to notify the occupant that, in a case that the automated driving allowed section included in the second route is not different from the automated driving allowed section included in the first route, a route other than the automated driving allowed section included in the second route is changed.

7. An automated driving control device comprising:
a navigation device configured to store a road map and an automated driving allowed section on the road map, and configured to set a first route to a destination including the automated driving allowed section on a basis of a current position of a vehicle; and
one or more first processors functioning as an automated driving mode control unit configured to perform an automated driving mode in which acceleration/deceleration and steering of the vehicle are automatically controlled in the automated driving allowed section included in the first route,
wherein the navigation device comprises one or more second processors functioning as:
a route generation unit configured to generate a second route which is different from the first route on a basis of a predetermined condition; and
a route change prohibiting unit configured to prohibit changing of the first route to the second route, in a case that the automated driving allowed section included in the second route is different from the automated driving allowed section included in the first route.

8. An automated driving control device comprising:
a navigation device configured to store a road map and an automated driving allowed section on the road map, and configured to set a first route to a destination including the automated driving allowed section on a basis of a current position of a vehicle; and
one or more first processors functioning as an automated driving mode control unit configured to perform an automated driving mode in which acceleration/deceleration and steering of the vehicle are automatically controlled in the automated driving allowed section included in the first route,
wherein the navigation device comprises one or more second processors functioning as a route generation prohibiting unit configured to prohibit generation of a second route which is different from the first route, in a case that the first route includes the automated driving allowed section.

* * * * *